March 24, 1970 M. CAMRAS 3,502,795

TRANSDUCER SYSTEM AND METHOD

Filed March 12, 1965

INVENTOR.
MARVIN CAMRAS

BY Hill, Sherman, Meroni, Gross & Simpson ATTORNEYS

3,502,795
TRANSDUCER SYSTEM AND METHOD

Marvin Camras, Glencoe, Ill., assignor to IIT Research Institute, Chicago, Ill., a corporation of Illinois Filed Mar. 12, 1965, Ser. No. 439,340
Int. Cl. H04n 5/16
U.S. Cl. 178—5.4 31 Claims

ABSTRACT OF THE DISCLOSURE

The illustrated embodiments relate to recording and playback of at least nine channels of color video and audio intelligence. The recorded channels are arranged so that the tracks to be successively reproduced by each head unit are in separate regions on the record medium, the head units thus being widely spaced. Novel video and audio head units are shown for minimizing interference between the recorded channels.

This invention relates to a transducer system and method and particularly to a transducing system and method for transducing color video signals.

It is an object of the present invention to provide an economical color video tranducing system such as would be particularly suitable for home or educational uses.

A further object of the present invention is to provide a wide band transducer system utilizing fixed heads and capable of a highly efficient use of a tape record medium.

Another object of the invention is to provide a video transducing system for transducing video signals and the associated audio signals with substantially reduced cross talk between the audio channel of the record medium and the video circuits of the playback head.

Still another object of the invention is to provide a color video transducer system for transducing color signals together with the associated audio signal and capable of providing a relatively long playing time for a given amount of record medium.

Other objects, features and advantages of the present invention will be apparent from the following detailed description taken in connection with the accompanying drawings, in which.

Figures 1, 2, 3, 4, 5:
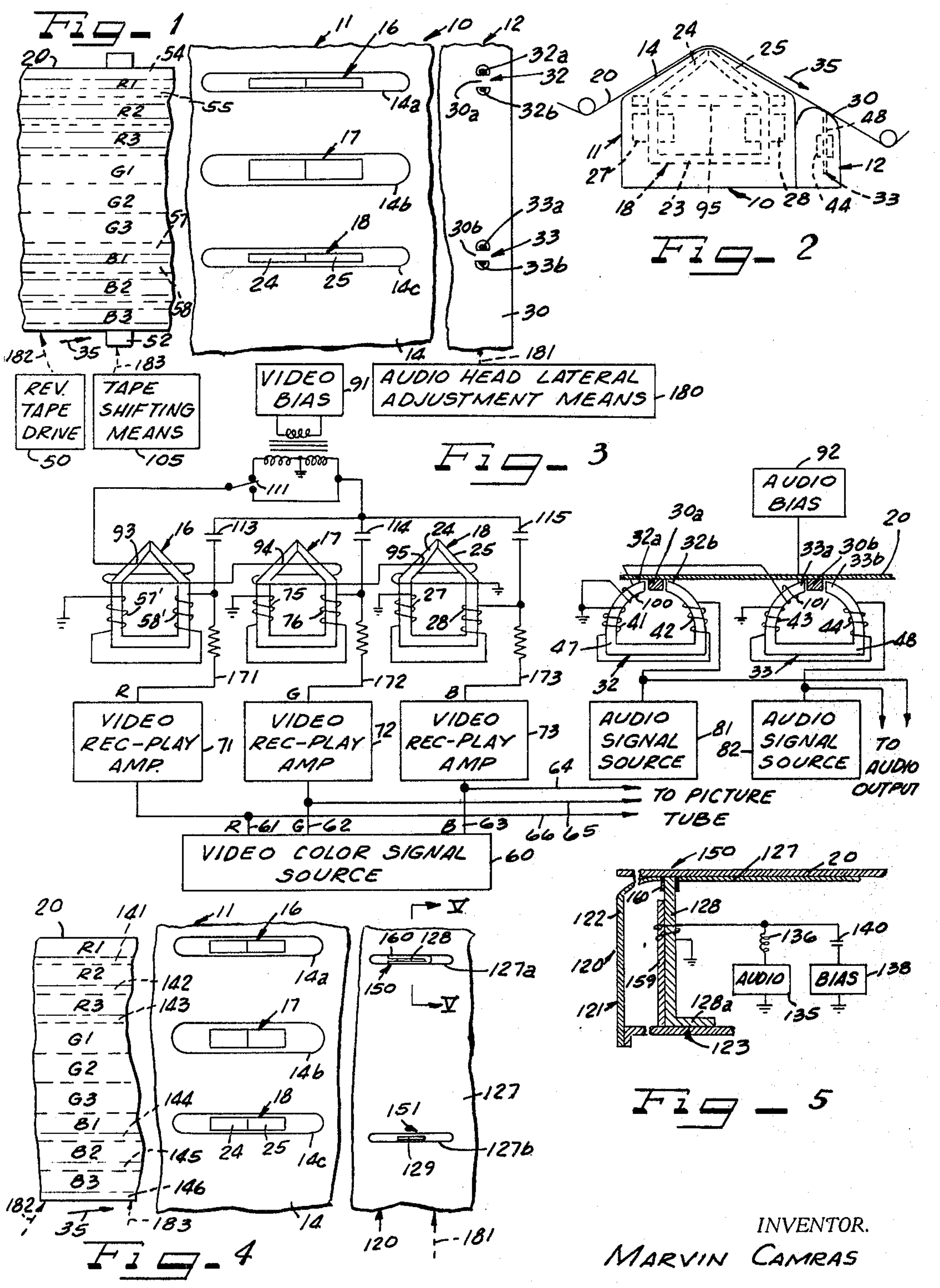
FIGURE 1 is a somewhat diagrammatic plan view of a transducer system for color signals and associated audio signals.
FIGURE 2 is a diagrammatic side elevational view of the system of FIGURE 1.
FIGURE 3 is a diagrammatic view illustrating a circu;it diagram for the system of FIGURES 1 and 2.
FIGURE 4 is a diagrammatic plan view similar to FIGURE 1 but illustrating a modified audio transducer head for the system of FIGURES 1–3.
FIGURE 5 is a fragmentary somewhat diagrammatic vertical sectional view of an audio head unit of the audio transducer head of FIGURE 4 and showing schematically an electric circuit associated with the audio head unit.

Referring to FIGURE 1, the transducer head assembly 10 is illustrated comprising a video transducer head 11 and an audio transducer head 12 secured in fixed relation to each other.

The video transducer head 11 may include a tape engaging housing part 14 which is of a soft magnetic material so as to serve as a keeper surface for inactive channels of the record medium. The video transducer head comprises a series of video transducer head units indicated at 16, 17 and 18, the tape engaging surfaces of which extend into respective openings 14*a*, 14*b* and 14*c* of the tape engaging surface 14. By way of example, the polar surfaces of the head units 16–18 may be substantially flush with the surface 14 for sliding engagement with the active undersurface of a tape record medium indicated at 20 in FIGURES 1 and 2. Each of the head units 16–18 comprises a pair of polar faces as seen in FIGURE 1 separated by a longitudinal gap so that the head units when energized with recording current record longitudinally directed fields on the record medium 20.

As indicated in FIGURE 2, each of the head units such as 18 may comprise a generally ring-shaped magnetic core 23 having respective pole pieces 24 and 25 providing the polar faces which are visible in FIGURE 1 and spaced to define a gap for coupling of the core 23 to a cooperating channel of the record medium 20. The pole pieces such as 24 and 25 of the head units 16–18 are substantially spaced from the housing part providing the tape engaging surface 14 so that the principal flux path for each core is directly between the pole pieces 24 and 25 rather than from the pole piece 24 through the housing part 24 to the pole piece 25. By way of example, each of the head units such as 18 may have a pair of electric windings 27 and 28 thereon for receiving a recording current during recording on the record medium 20 and for poducing a playback signal during playback of the signals recorded on the record medium.

The audio transducer head 12 illustrated in FIGURES 1–3 similiarly may comprise a tape engaging keeper surface 30 of magnetically soft material for engaging inactive channels on the record medium as well as the channels scanned by the video head units 16–18. The audio transducer head 12 comprises audio head units 32 and 33 including respective pole faces 32*a*, 32*b*, 33*a*, 33*b* for cooperating with portions 30*a* and 30*b* of the tape engaging surface 30 to define respective audio transducing gaps which are directed in a lateral direction transverse to the direction of movement of the record medium 20 which direction of movement is indicated by the arrow 35 in FIGURE 1. It will be observed that the audio head units record audio tracks at each side of the video tracks recorded by head units 16 and 18, respectively.

The pole faces 32*a* and 32*b* are connected by a generally ring-shaped core having windings 41 and 42, FIGURE 3, thereon which are energized in aiding relation during recording. Similarly, the pole faces 33*a* and 33*b* are connected by a generally ring-shaped core having windings 43 and 44 thereon which are energized in aiding relation during recording.

The cores for audio head units 32 and 33 are indicated diagrammatically at 47 and 48 in FIGURE 3. The portions of the tape engaging surface 30 between the poles 32*a* and 32*b*, and 33*a* and 33*b* are indicated diagrammatically at 30*a* and 30*b* in FIGURE 3.

During recording operation, the tape record medium 20 is driven in the forward direction, for example, as indicated by the arrow 35 by means of a reversible tape drive component indicated diagrammatically at 50. The tape may be driven at a relatively high speed such as 60 inches per second or 120 inches per second. In the recordign operation with the position of the tape guide means 52 indicated in FIGURE 1, the channel on the tape marked R1 travels in coupling relation to the video head unit 16, the channel marked G1 travels in coupling relation to the video head unit 17 and the channel marked B1 travels in coupling relation to the head unit 18. Audio channels as indicated at 54 and 55 are located on opposite sides of the channel R1 and travel across the tape engaging surface 14 on respective opposite sides of the head unit 16. These audio channels 54 and 55 move across the lateral audio gaps defined between the pole face 32*a* and portion 30*a*, and between portion 30*a* and polar face 32*b*, respectively. The video channel R1 travels in engagement with the surface portion 30*a* and is thus shielded from the audio windings 41 and 42 of the audio head unit 32.

The video channel indicated at B1 on the record medium 20 travels in coupling relation to the video head unit 18 and then travels over the surface portion 30*b* so as to be isolated from audio windings 43 and 44. Audio channels 57 and 58 on respective opposite sides of the channel B1 travel over the tape engaging surface 14 at the sides of head unit 18 but travel in coupling relation to the audio head unit 33 at the region between the pole 33*a* and portion 30*b*, and at the region between portion 30*b* and pole 33*b*, respectively.

The result is that during a recording operation, video signals, for example red, green and blue color signals, are recorded along channels R1, G1 and B1, respectively, while related intelligence such as stereophonic audio signals are recorded on audio channels 54 and 55, and audio channels 57 and 58. The audio fields recorded on channels 54 and 55 have the same instantaneous direction in the plane of the tape so that leakage fields from the channels 54 and 55 tend to cancel at the video windings indicated at 57′ and 58′ on the video head unit 16. Similarly, the recorded tracks on the channels 57 and 58 are in aiding relation with respect to the plane of the tape so that leakage fields from channels 57 and 58 tend to cancel with respect to the video windings such as 27 and 28. It should be understood that the cancellation is with respect to the video windings of a head unit which is located in a plane directly between a pair of audio channels such as 54 and 55, or 57 or 58.

Referring to FIGURE 3, the reference numeral 60 may designate a suitable source of color signals such as the video circuits of a conventional color television receiver. By way of example, the component 60 may provide a signal varying in accordance with the red color component of a visual image at line 61, the green component at line 62 and the blue color component at line 63. In a conventional color television set, these signals may be supplied directly to respective control grids of a multigun color television tube as indicated by lines 64–66. The same color signals may be supplied to amplifier components 71, 72 and 73 which during recording operation are conditioned to supply suitable recording currents to the windings of the respective video head units 16, 17 and 18. Thus amplifier component 71 supplies recording current to windings 57′ and 58′ in series so as to produce a longitudinally directed field at the longitudinal gap fluctuating in accordance with the red component of a visual image. The amplifier component 72 produces a recording current in the windings 75 and 76 of head unit 17 in series to produce a longitudinal field component at the gap varying in accordance with the green color component of the visual image. The amplifier component 73 produces a recording current in the windings 27 and 28 in series to produce a longitudinal field component at the gap of the head unit 18 varying in accordance with the blue color component of the visual image. At the same time, suitable audio sources 81 and 82 may supply audio recording currents to windings 41 and 42 in series, and windings 43 and 44 in series, respectively. The windings 41 and 42 may be connected so as to produce aiding magnetomotive forces with respect to the loop magnetic circuit including the core 47, pole face 32*a*, portion 30*a*, and pole face 32*b*. Similarly, the windings 43 and 44 may be connected so as to produce aiding magnetomotive forces with respect to the loop magnetic flux path including the core 48, pole face 32*a*, portion 30*b*, and pole face 33*b*.

Suitable video and audio biasing means are preferably provided as indicated by components 91 and 92 in FIGURE 3. While any conventional biasing arrangement may be employed, by way of example, cross field bias windings may be located as indicated at 93, 94 and 95 in FIGURE 3 for the video head units 16, 17 and 18, and may operate on the cross field principle in conjunction with windings 57′–58′, 75–76 and 27–28, respectively. Bias windings 100 and 101 are indicated for the audio head units 32 and 33 in FIGURE 3. With respect to the longitudinally disposed video head units 16–18, during forward movement of the record medium 20, windings 93, 94 and 95 are energized with high frequency constant amplitude bias current of one phase from bias source 91 for example; while during reverse movement of the record medium 20, windings 93, 94 and 95 are energized with high frequency bias current of opposite phase from the bias source 91. Since the audio head units 32 and 33 are laterally directed and do not utilize cross field type biasing, the energization of bias windings 100 and 101 need not be altered in dependence on the direction of movement of the record medium. Preferably, the bias currents are of a frequency at least several times greater than the highest frequency component to be recorded by the associated head and are of a frequency so as not to interfere or beat with the frequency components being recorded. By way of example, components 91 and 92 may comprise frequency multipliers coupled to the horizontal deflection generator of a conventional color television set as represented by component 60. For audio bias frequency, the horizontal line rate frequency of 15,750 cycles per second may be multiplied by a factor of the order of 5, while for the video circuits, the horizontal line rate may be multiplied by a factor of the order of 200. The components 91 and 92 may include suitable filtering and amplification means at the output of the frequency multipliers so as to provide substantially sine wave constant amplitude bias currents to the respective head units.

At the end of the forward movement of the tape, the tape may be stopped, and then shifted laterally by means of a tape shifting component 105 to register further channels with the respective head units. Thus, for example, channels R2, G2 and B2 may be registered with the video head units 16, 17 and 18, and further audio channels may be registered with the audio head units 32 and 33. The bias switching means 111 may be actuated so as to reverse the phase of the bias current to windings 93, 94 and 95 during reverse movement of the tape 20.

In the diagrammatic illustration of FIGURE 1, the width of the tape 20 has been divided by dash lines spaced apart in accordance with the indexing distance determined by the tape shifting means 105. The width of the center three channels corresponds to the width of the green channels G1, G2 and G3. The other channels indicated may be thought of as composite channels. For example, the uppermost channel includes a central red channel R1 and the audio channels 54 and 55. The width of the red channels such as R1 may be considered to correspond to the width of the surface portion 30*a* in FIGURE 1. The remaining portions of the composite channel may be thought of as comprising the audio channels 54 and 55. The actual track width of the video signals will substantially correspond to the transverse dimension of the poles of the head units. Thus, the track width of a blue track such as in channel B1 will correspond to the width or transverse dimension of pole pieces 24 and 25 at the region of the coupling gap therebetween. The transverse audio tracks will have a width generally corresponding to the transverse gap dimension between a pole face such as 32*a* and the portion 30*a*, for example.

Where the tape is successively reversed in direction, it will often be preferably to have each head unit scan an even number of channels so that the tape will be rewound onto the same reel as when the transducing operation began, at the end of the transducing operation. Thus, in a preferred arrangement, there might be four red-audio composite channels, four green channels and four blue-audio composite channels.

A concept of the present invention is to space the color video head units apart in the lateral direction by at least twice the greatest of the scanning widths of the head units so that at least one video or composite channel on the tape 20 is located between the successive video head units. The scanning widths of the head units are considered to correspond to the track width produced thereby during recording, and to correspond to the width of recorded track effectively sensed by the head unit during playback. Thus in the illustrated embodiment when the composite channel including channel R1 is aligned with head unit 16, the composite channels including channels R2 and R3 are located between head units 16 and 17. Similarly the relatively wide channels G2 and G3 are located between the head units 17 and 18.

For maximum use of the record medium, the spacing center to center between head units may be substantially equal to an integral multiple of the indexing distance as determined by the tape shifting means 105.

In the preferred embodiment which is particularly adapted for recording of color television signals, the head unit for recording the greatest band width, for example the green color signal in the illustrated embodiment, is substantially wider than at least one of the other head units. Further, one or more of the narrower head unit preferably has one or more offset audio recording gaps for recording an audio signal at one or both sides of the narrower video track or tracks.

Thus referring to FIGURE 1, the tape shifting means 105 may provide an indexing distance equal to one-third the center to center spacing between the composite channel including channel R1, and the channel G1. This indexing distance would then be equal to the width of one of the green channels G1, G2 or G3. In the illustrated embodiment, the width of the composite red-audio channels and of the composite blue-audio channels is equal to the width of the green video channels.

The cross field principle of operation as illustrated in FIGURE 3 is explained in detail in my copending application Ser. No. 407,402 filed Oct. 29, 1964, and the video head units of the present application may correspond to any of the embodiments of said copending application, the disclosure of which is specifically incorporated herein by reference in its entirety. As indicated in FIGURE 3 a high frequency bias current of fixed phase is supplied to the windings 57′ and 58′, 75 and 76, and 27 and 28 via respective capacitors 113, 114 and 115.

After a recording has been made on the tape 20, for example the visual and audible components of an event, the same magnetic head assembly 10 may be utilized to reproduce the recorded intelligence. During playback, the tape shifting means would position the tape with the first channels in alignment with the head units, and the tape drive 50 actuated in the forward direction at the same transducing speed as utilized during recording operation. During playback operation, the video and audio bias components 91 and 92 would be disabled and the amplifier components 71–73 would be switched to a play mode where the head windings such as 57′ and 58′ would be connected to the input of the amplifier component and the output would be connected to the line 66, for example, to supply the reproduced red color signal to the picture tube. The windings may be switched and connected to external circuitry in any of the manners taught in my copending application Ser. No. 407,402. During playback, the video color signal source 60 and the audio signal sources 81 and 82 would not, of course, be operating. The recording and playback circuitry may preferably comprise any of the embodiments of my copending application Ser. No. 401,832 filed Oct. 6, 1964, and entitled, "Transducer System." Thus the video amplifier components would include recording equalizers suitable for the heads. A color television receiver may provide an output level at 61, 62 and 63 which may be fed to the head equalizer circuit directly without amplification in some cases.

The theoretical aspects of the cross field principle are explained in detail in my article entitled, "An X-Field Micro-Gap Head for High Density Magnetic Recording," published in IEEE Transactions on Audio, volume AU–12, No. 3, May-June, 1964, and the explanation and other teachings of this article are incorporated herein by reference.

FIGURES 4 and 5 illustrate a preferred audio transducer head arrangement for the system of FIGURES 1–3. The arrangement of the video transducer heads 16, 17 and 18 is identical to that of FIGURE 1 and the electric circuitry associated with the video head units may correspond exactly to that described in connection with FIGURES 1 through 3. The audio transducer head 120 may, however, comprise a housing 121 including a housing part 122 and a closure part 123, FIGURE 5. As in the previous embodiment, the housing part 122 provides a tape engaging surface 127 with elongated openings **127*a* and 127*b* therein. In the embodiment of FIGURES 4 and 5, however, there are only two openings in the tape engaging surface of the audio head instead of four as illustrated in FIGURE 1. Active poles 128 and 129 project into the openings 127*a* and 127*b* and may terminate in tape engaging faces which are flush with the surface 127 or project slightly thereabove. Referring to FIGURE 5, it will be observed that the active poles such as 128 may have turned lower end portions 128*a* in flatwise low reluctance engagement with the closure part 123 of the magnetic housing 121. The active poles 128 and 129 may have windings thereon as indicated at 131 in FIGURE 5 for establishing laterally directed magnetic fields between the center pole and the laterally adjacent edges of the tape engaging surface 127. In the illustrated embodiment, an audio source 135 is coupled to the winding 131 through suitable inductance means 136, while a high frequency bias current is supplied to the winding 131 from a high frequency bias source 138 through a suitable capacitor 140. The inductance 136 may have a relatively high impedance at the bias frequency, while the capacitor 140 may have a relatively high impedance at the audio frequencies. The result, during recording, is that there are two laterally directed audio fields produced by the winding 131 which fields have opposite instantaneous directions in the plane of the tape path. Each audio head unit thus records two oppositely poled audio tracks, in the embodiment of FIGURE 4, the oppositely poled audio tracks of each audio head unit are recorded in a channel which is to one side of a narrow band width color channel. Thus, if the red, green and blue channels are designated by the reference numerals R1–R3, G1–G3 and B1–B3 as in the embodiment of FIGURE 1, the audio channels will be located as indicated at 141–146** in FIGURE 4.

As in the previous embodiment, the red and blue channels together with the associated audio channels may define composite channels having a width corresponding to the indexing distance determined by the shifting means such as indicated at 105. In the embodiment of FIGURES 4 and 5, preferably the red and blue transducer head units 16 and 18 are not centered with respect to the composite channels but are offset so as to make maximum use of the composite channel space in conjunction with the associated audio transducer head unit.

As in the previous embodiment, after a first set of channels such as R1, 141, G1, B1 and 144 have been recorded on, the tape drive means 50 may automatically stop, the tape shifting means shift the guide means 52 one indexing distance, and the tape drive means 50 be actuated in the reverse direction to record on channels R2, 142, G2, B2 and 145. The tape is again reversed for recording on the third set of channels, the phase of the video bias signal to cross field windings 93–95 being reversed with each reversal of tape direction as described in connection with FIGURE 3.

By way of a specific dimensional example, if there are to be twelve overall channels for a tape width of one-half inch, each channel will have a width dimension of 41⅔ mils (one mil equals .001 inch). In this event, the video transducer head units 16 and 18 may have a scanning width of about 21 mils, while the transducer head unit 17 may have a scanning width during recording of about 31 mils. Further, by way of example, the openings **127*a* and 127*b* may have a transverse dimension of about 6 mils with the active poles 128 and 129** having a transverse dimension or thickness of 2 mils centered within the respective openings. The scanning width of the audio transducer units may be considered to be 6 mils in this case.

During playback operation in the embodiment of FIGURES 4 and 5, the bias component 138 is inactive, and the output of the winding 131 is delivered to suitable amplifier means as in the preceding embodiment.

By way of example, to define the two-mil gap at each side of the active poles 128 and 129, a two-mil thick ribbon of copper or other electrically conductive material may be wrapped about three sides of the active pole where it projects through the opening in the tape contacting surface 127. The active poles 128 and 129 may have a length in the direction of movement of the tape of from 6 to 15 mils or more, the longer the longitudinal dimension of these active poles the higher the output; the shorter the longitudinal dimension of the active poles, the higher the frequency response. Thus, where the longitudinal dimension of the poles 128 and 129 is ten mils, the conductive ribbon might form a U-shape with its legs extending in the direction of movement of the record medium and having a length of the order of 14 mils. The ends of the ribbon would be spaced apart and electrically insulated to avoid a shorted turn about the active pole.

The advantage of the audio head of FIGURES 4 and 5 is that it produces oppositely poled closely adjacent tracks which tend to cancel each other with respect to windings such as the windings of the adjacent video head units for minimum cross talk during playback. The keeper surfaces in each of the embodiments such as 14, 30 and 127 further contribute to the low cross talk during playback, enabling a maximum utilization of the record medium.

With the embodiment of FIGURE 1, if some coupling does occur during playback between the audio recorded tracks and the video head units centrally therebetween, this can be minimized by a fine lateral adjustment of the tape 20 relative to the head assembly 10. With the audio channels 54 and 55 located symmetrically with respect to the video windings such as 57 and 58, optimum cancellation is obtained for minimum cross talk. Similarly, any slight coupling of the recorded video signal with respect to the audio windings such as 41 and 42 is minimized because of the oppositely poled connection of the windings 41 and 42 during playback. In each of the embodiments, the tape engaging polar surfaces may be flush with the keeper surfaces adjacent thereto or may project beyond the keeper surfaces slightly. In the illustrated embodiment, the video head units 16 and 18 may be identical, the audio head units 32 and 33 may be identical and audio head units 150 and 151 comprised of active poles 128 and 129, respectively, may be essentially identical or comparable.

With respect to each of the video head units, the adjacent keeper surface edge should be relatively widely spaced from the video core at the leading and trailing sides of the video core as generally indicated in FIGURES 1 and 4. Similarly, the adjacent edges of the keeper surfaces associated with the audio poles should be relatively widely spaced except at the portion defining part of the transverse audio gap. Thus with respect to the active pole **32*a*, the curved edge portion of the keeper surface should be relatively widely spaced compared to the edge portion directly confronting and defining the transverse audio gap with the active pole 32*a***. This relationship has been indicated generally in the drawings. With respect to the audio head units, the objective is, of course, to minimize any longitudinal recording field components at the audio heads. As previously indicated, the longitudinal dimension of the active poles of the audio head units are made relatively long for high output and are made relatively short where high frequency response is the critical factor.

While the illustrated embodiments are concerned with color components and audible components of the same event, it is evident that the broader aspects of the invention are applicable to many different recording problems, where components of different band widths are to be recorded with efficient utilization of available record media space. It will be apparent that the invention is applicable to other record media configurations besides a tape configuration, and besides a tape configuration utilizing two separate reels. For example, the tape may be in the form of an endless loop, with a relative shifting of the tape and the head units at the end of each set of channels without any reversal in the direction of tape movement. The channels may then be in what may be termed a helical relationship, or the channels may be in what may be termed a parallel relationship with a definite shifting of the head unit relative to the tape a distance equal to the separation between channels near the end of each set of channels in the manner illustrated in my U.S. Patent No. 2,857,164 issued Oct. 21, 1958. Typical record media configurations and handling means are illustrated in my prior U.S. Patents 2,647,750, 2,694,107, 2,706,118, 2,729,453, 2,840,642, 2,857,164 and 3,025,011. A preferred tape transport arrangement is illustrated in my copending application Ser. No. 401,832 filed Oct. 6, 1964. The disclosure of this copending application is incorporated herein by reference in its entirety.

It may be specifically noted that many of the broad concepts of the present invention are applicable to other recording methods, such as photographic and electrostatic recording. Electrostatic recording modes are illustrated in my U.S. Patent No. 3,040,124. Electrostatic recording, for example, may be carried out with a three pole head with lateral gaps generally as illustrated in FIGURE 5 of the present case to produce laterally adjacent oppositely poled tracks on an electrostatic record medium.

It will be understood that in each of the embodiments, the transducer head assembly 10 may be shifted rather than shifting the tape record medium.

For the case of a magnetic transducer system, it will be understood that the transducer element for converting between magnetic signal flux and electric signal current during playback need not be an electric winding, but could be some other form of flux transducer such as those shown in my U.S. Patent 3,053,939 and in Camras and Brophy U.S. Patent No. 3,114,009.

Pole pieces 128 and 129 are preferably tapered or stepped adjacent the respective apertures **127*a* and 127*b* so that the body portions surrounded by the windings such as 131 are of larger cross section than the pole portions within the apertures. A further lamination of magnetic material is indicated at 159** in FIGURE 5 to illustrate this preferred configuration.

A split copper band surrounding the polar tip of pole piece 128 is indicated at 160 in FIGURES 4 and 5. A similar band may be provided about the pole tip of pole piece 129. These bands minimize flux leakage losses between the pole pieces 128 and 129 and the housing 121.

In FIGURE 1, a beryllium copper spacer is preferably used in the gaps of the audio head units 32 and 33. These gap spacers may be in the form of split bands, surrounding the pole tips **32*a*, 32*b*, 33*a*, 33*b*** except for an insulation gap to prevent an electrical short circuited turn around the pole tips.

In each of the embodiments, the video recorded tracks should preferably be covered by the keeper surface 30 or 127 at the audio head, and the audio recorded tracks should preferably be covered by the keeper surface 14 at the video head. However, audio tracks are poled so as to tend to balance out any coupling to the video windings if the coverage or contact of the keeper surface 14 with the audio tracks is imperfect.

An advantageous modification of the illustrated embodiment might provide video head units such as 16–18 of equal scanning width and spaced center to center by an even multiple of the indexing distance such as twice the indexing distance. Two stereo audio head units could be associated with and located within the confines of a fourth channel spaced center to center from the adjacent video channel by twice the indexing distance to provide two sets of four channels interlaced with each other and relating to the same event but at successive time intervals. With this arrangement, even with relatively narrow pairs of oppositely poled audio tracks in the fourth channel, such as produced by the audio head units of FIGURES 4 and 5, the two pairs of oppositely poled tracks can be aligned with the adjacent audio head units during playback in spite of possible dimensional changes in the tape and the like subsequent to recording. With widely separated pairs of audio tracks as produced by the embodiments of FIGURES 1–5, dimensional changes in the tape might make proper alignment of both pairs of audio tracks with the audio playback units difficult for very narrow track widths.

While in the preferred embodiment, red, green and blue components of a visual event are supplied by source 60, other components of a visual event may be supplied by source 60 such as the Y, I and Q signals or the Y, $R-Y$, $G-Y$ and $B-Y$ signals found in conventional color television circuitry. The Y signal may be supplied to a wider video head unit such as 17 while the narrower bandwith I and Q signals may be supplied to head units 16 and 18. Where Y, $R-Y$, $G-Y$ and $B-Y$ signals are recorded, the video head units may be four in number and of equal width with the audio signals placed in a fifth channel.

In a conventional color television receiver where Y, and $R-Y$, $G-Y$ and $B-Y$ signals are supplied to respective electrodes of three electron guns in the picture tube, a suitable adding circuit in components 71–73 could add the Y and $R-Y$, the Y and $G-Y$ and the Y and $B-Y$ signals, respectively, from component 60 to provide the red, green and blue signals at lines 171–173. The Y signal could be recorded on a fourth channel for black and white playback and for use in generating Y, $R-Y$, $G-Y$ and $B-Y$ signals during playback. Thus the playback circuitry for the fourth Y channel could include means for supplying an inverted Y signal to circuits 71–73. Components 71–73 during playback would include means for adding the inverted signal to the red, green and blue color signals reproduced by head units 16–18. In this case, the reproduced Y signal could be supplied to the cathodes of the three electron guns, while the $R-Y$, $G-Y$ and $B-Y$ signals would be supplied to control grids of the red, green and blue electron guns of the picture tube. See the circuits of FIGURE 16–218, 16–220 and 16–226 of Television Engineering Handbook by Fink, 1957.

All of the aforementioned signals including the Y signal are considered video color signals for the purposes of the disclosure and claims herein.

While the preferred embodiments given herein are with respect to U.S.A. standard broadcast color television receivers, the system herein disclosed may obviously be adapted to other color television standards and practices.

The term video signal as used herein implies a megacycle bandwidth. For picture information, a video signal may include information as to D.C. level of the picture signals and horizontal and vertical deflection signals. The term video signal includes radar, telemetering, and carrier communication signals (as in predetection recording) having a megacycle bandwidth, to all of which the broad concepts of this invention may be applied.

The term audio signal refers to a signal having frequency components which are all less than 30 kilocycles per second, and is not limited to signals representing audible sound waves. In the illustrated embodiments the audio head units may have a frequency response limit appreciably less than 30 kilocycles per second, for example 15,000 cycles per second.

In FIGURE 1 an audio head lateral adjustment means is indicated at 180 which is mechanically coupled as indicated at 181 to the audio head assembly 12 to provide for fine lateral adjustment of the audio head units 32 and 33 relative to the video head units 16–18. Where the video head units 16–18 are fixed to a mounting means, the fine lateral adjustment 180 would adjust the audio head 12 relative to such fixed mounting means. Where the head assembly 10 is laterally shiftable to register the head units with successive channels, the fine lateral adjustment means 180 would operate relative to the overall head shifting means. The mechanical couplings of the drive component 50 and the tape shifting means 105 are indicated by dash lines 182 and 183 in FIGURES 1 and 4.

Referring to the audio head units of FIGURES 4 and 5, the trailing edge of the apertures **127*a* and 127*b* may be in close relation to the trailing edge of the poles 128 and 129 so as to provide a longitudinal component of the audio signals supplied to the audio windings such as 131 along a channel between the oppositely poled transversely recorded channels produced by the head units 150 and 151. The total width of the audio channels associated with each of the head units 150 and 151 may still be six mils as in the specific embodiment mentioned previously herein. Of course, only one head unit may be provided if stereophonic audio signals are not involved. A single audio head unit may be associated with any of the video head units including the head unit 17, for example. The head units 16, 17 and 18** may, of course, be arranged in any order across the width of the tape, and the terms "first," "second" and "third" used in the claims are not intended to imply any particular order across the tape.

It will be observed that the openings such as **14*b* may have a total width greater than the channel width without causing interference. For example, if the head unit 17 is 31 mils wide and the channel width is 41⅔ mils, then the opening 14*b* can approach 52⅓ mils, and the adjacent recorded tracks will still be covered by the keeper surface 14. The wider openings improve the magnetic efficiency of the head unit. Conductive fillers for the side openings between the head units and the openings such as 14*a*–14*c*** are preferred for further improvement.

Sound tracks such as produced by head units 32 or 150 can, of course, be used by themselves, independently of video recording, and this also applies to the case where the head unit 150 has two oppositely poled transversely recorded tracks together with a longitudinally recorded intermediate track as just described. The head units may have different spacings than illustrated, and the successive indexing distances provided by the shifting means 105 need not necessarily be equal. For example, audio head units such as 32 could be shifted upwardly as viewed in FIGURE 1 by a multiple of the indexing distance and the arrangement would still be operative; further, the audio head units such as 32 or 150 may be placed in transverse alignment with the gaps of the video head units in modified arrangements.

Referring to the embodiment of head unit shown in FIGURES 4 and 5, for example, the center pole 128 may taper to a point in the direction of arrow 35 with the aperture **127*a* conforming to the tapering sides of the pole 128** to provide oppositely poled transversely recorded tracks which are substantially contiguous, rather than oppositely poled transversely recorded tracks with a spacing therebetween of the order of 2 mils as for the specifically illustrated embodiment. Where the direction of tape movement is to be reversible, the center pole may have a diamond shaped tape engaging polar face with an aperture configuration conforming thereto so as to provide contiguous oppositely poled transversely recorded tracks in each direction of movement of the record medium.

As a further alternative, there may be a plurality of laterally spaced apertures such as shown at 127*a* for each audio head unit, with an active pole centered in each successive aperture and preferably aligned in the lateral direction to provide a succession of oppositely poled transversely recorded track portions of alternatively opposite polarity. The active pole pieces associated with the successive apertures of a head unit can be joined to a common leg energized by a coil in the same manner as illustrated for coil 131 in FIGURE 5. The output of $n$ pairs of oppositely poled transversely recorded tracks is $n$ times the output of a single head unit such as illustrated in FIGURE 4. With thin record coatings where a single pair of transversely recorded oppositely poled tracks have the same overall width as a record with multiple pairs of oppositely poled tracks, the stray field due to the multiple pairs of oppositely poled tracks is a small fraction of that with a record having a single pair of oppositely poled tracks. Also the demagnetization effects are reduced. Where other considerations permit, the track width $w$ is adjusted to give the maximum energy product, for the magnetic properties of the tape coating, the length of the active poles of the head unit, the coating thickness and the typical wavelength of the signal to be recorded. Energy product is a function of the dimensions of the magnetic tape and its demagnetization curve.

Instead of using the keeper surface as part of the audio head units, the audio head units may be provided by two or more laterally offset interleaved poles. Such audio heads would resemble those of my U.S. Patent No. 2,784,259, but with the gaps between the interleaved poles being directed laterally relative to the direction of movement of the record medium rather than longitudinally as illustrated in said Patent 2,784,259. Successive pairs of gaps would normally be equal for audio head units in accordance with the present invention rather than unequal as in said patent 2,784,259.

The lateral recordings are efficient at long wavelengths (even at infinite wavelengths) in contrast to longitudinal recordings which fall off in the flux that they can produce in a head inversely as a function of wavelength and become useless as the wavelength is increased indefinitely.

While the present invention has been described with particular reference to the recording of television signals, the systems disclosed herein are also useful in the general field of wide-band recording including radar, telemetering, F-M carrier, data and predetection recording, etc.

Preferably, the deflection signals associated with a color television signal are supplied by the source 60 to one or more of the video head units, for example to head unit 17 and are handled by circuitry similar to that disclosed in my copending application Ser. No. 401,832 filed Oct. 6, 1964.

The advantage of a diamond shaped pole in a diamond shaped conforming aperture (as compared to a wedge shaped pole and aperture) for an audio head unit is that longitudinal recording fields may be effectively avoided at both the leading and trailing edges, so that only oppositely poled substantially contiguous transversely directed tracks are recorded, whether the tape always moves in one direction (as with an endless loop system) or is reversed.

It will be apparent that many modifications and variations may be effected without departing from the scope of the novel concepts of the present invention.

I claim as my invention:

1. A transducer system comprising a transducer head having first and second transducer head units spaced apart in a lateral direction for scanning cooperation with respective first and second laterally spaced channels of a record medium, said first and second head units having respective first and second scanning widths with said second scanning width being substantially greater than said first scanning width and the center to center lateral spacing between the first and second head units being at least twice said second scanning width, a further head unit for scanning cooperation with a further channel of the record medium adjacent said first channel, with the further head unit together with the first head unit defining an overall lateral scanning width corresponding to the lateral extent of the region occupied by the first and further channels together, and means for shifting said transducer head and said further head unit as a unit relative to said record medium an indexing distance at least substantially equal to the greater of said second scanning width and said overall lateral scanning width.

2. The transducer system of claim 1 with said further head unit being separate from and laterally adjustable relative to said transducer head.

3. A transducer system comprising a transducer head having first and second transducer head units spaced apart in a lateral direction for scanning cooperation with respective first and second laterally spaced channels of a record medium, said first and second head units having respective first and second scanning widths with said second scanning width being substantially greater than said first scanning width and the lateral spacing between the first and second head units being a multiple of said second scanning width, a further head unit for scanning cooperation with a further channel of the record medium adjacent said first channel, with the further head unit together with the first head unit defining an overall lateral scanning width corresponding to the lateral extent of the region occupied by the first and further channels together, means for shifting said transducer head and said further head unit as a unit relative to said record medium an indexing distance at least substantially equal to the greater of said second scanning width and said overall lateral scanning width, means for supplying a first video color signal to said first head unit having a relatively narrow band width and for supplying a second video color signal to said second head unit having a substantially wider band width than said first video color signal and related to the same event as said first video color signal, and means for supplying an audio signal related to the same event as said first and second video color signals to said further head unit.

4. A transducer system comprising a transducer head having first and second transducer head units spaced apart in a lateral direction for scanning cooperation with respective first and second laterally spaced channels of a record medium, said first and second head units having respective first and second scanning widths with said second scanning width being substantially greater than said first scanning width and the center to center lateral spacing between the first and second head units being at least twice said second scanning width, a further head unit for scanning cooperation with a further channel of the record medium adjacent said first channel, with the further head unit together with the first head unit defining an overall lateral scanning width corresponding to the lateral extent of the region occupied by the first and further channels together, means for shifting said transducer head and said further head unit relative to said record medium an indexing distance at least substantially equal to the greater of said second scanning width and said overall lateral scanning width, and a record medium coupled with said first and second and said further head units and having first channels and further channels interlaced along a first region of the record medium for coupling with the first and futher head units respectively in successive indexing positions thereof as determined by said shifting means, and having a group of successive second channels for coupling with said second head unit in successive indexing positions of said second head unit as determined by said shifting means.

5. A transducer system comprising a transducer head having first, second and third transducer head units spaced apart in a lateral direction for scanning cooperation with respective first, second and third laterally spaced channels of a record medium, said first, second and third head units having respective first, second and third scanning widths, the center to center lateral spacing between the first and second head units and between the second and third head units being at least twice the greatest of the scanning widths, means for successively shifting said transducer head relative to said record medium an indexing distance at least substantially equal to the greatest of said scanning widths of said head units to place each head unit in scanning relation to successive ones of a group of channels on the record medium which are spaced apart by said indexing distance, with the groups of channels scanned by the respective head units being on separate regions of the record medium without intermixture of the channels scanned by the respective head units, means for supplying to said first head unit a video color signal having a relatively narrow band width, for supplying to said second head unit a second video color signal having a substantially wider band width than said first video color signal and related to the same event as said first video color signal, and for supplying to said third head unit a third video color signal having substantially the same band width as said first video color signal, and means for recording an audio signal related to the same event as said first, second and third video color signals in the region between successive first channels.

6. A transducer system comprising a transducer head having first, second and third transducer head units spaced apart in a lateral direction and in lateral alignment for scanning cooperation with respective first, second and third laterally spaced channels of a record medium, said first and third head units having substantially the same scanning width, and said second head unit having a scanning width substantially greater than said first and third head units, the center to center lateral spacing between adjacent head units being at least twice said second scanning width, means for successively shifting said transducer head relative to said record medium an indexing distance at least substantially equal to said second scanning width to place each head unit in scanning relation to successive ones of a group of channels on the record medium which are spaced apart by said indexing distance, with the groups of channels scanned by said first, second and third head units being separate from each other, and at least one further head unit having a scanning width less than said first and third head units and arranged for scanning cooperation with further channels of the record medium which further channels are interleaved with said first channels.

7. A transducer system comprising in combination a transducer head having first, second and third transducer head units spaced apart in a lateral direction for scanning cooperation with respective first, second and third laterally spaced channels of a record medium, said first and third head units having substantially the same scanning widths and said second head unit having a scanning width substantially greater than said first and third head units, means for successively shifting said transducer head relative to said record medium an indexing distance at least substantially equal to the scanning width of said second head unit to place said first, second and third head units in scanning relation to successive channels of respective first, second and third groups of channels on the record medium, with the groups of channels scanned by said first, second and third head units being separate from each other, means for supplying red, green and blue color information with respect to an event to said first, second and third head units, respectively, and means for recording audio information relating to said even on successive channels which are disposed between the successive channels of at least one of said first and third groups.

8. A transducer system comprising a first transducer head having first, second and third transducer head units, a record medium having first, second and third video color information channels for coupling with said first, second and third transducer head units respectively and having first and second audio information channels adjacent said first and third video color information channels respectively, a second transducer head having fourth and fifth transducer head units for coupling with said first and second audio information channels on said record medium, and means for successively shifting said first and second transducer heads relative to said record medium an indexing distance, said first, second and third transducer head units being spaced from each other center to center by at least twice said indexing distance.

9. A transducer system for transducing video color signals and audio signals associated with the same event comprising a record medium having a plurality of sets of channels each set consisting substantially of first, second and third video color channels and fourth and fifth audio channels, a first transducer head having first, second and third transducer units arranged for scanning cooperation with said first, second and third video color channels respectively of each set in succession, a second transducer head having fourth and fifth transducer head units arranged for scanning cooperation with said fourth and fifth audio channels of each set in succession, circuit means for connecting a color television receiver with said first, second, third, fourth and fifth transducer head units and for selectively supplying to said head units red, green and blue color signals and first and second audio signals, respectively, during recording, and for visually and audibly reconstructing an event recorded on the record medium during playback, and means for successively shifting the first and second transducer heads relative to the record medium an indexing distance to place said first and second transducer heads in scanning relation to successive sets of channels on said record medium, said first, second and third transducer head units being in transverse alignment but being spaced from each other center to center by a distance equal to at least twice said indexing distance.

10. A transducer system comprising a transducing head having first and second transducer head units spaced apart in a lateral direction for scanning cooperation with respective first and second laterally spaced video channels of a record medium, a third transducer head unit arranged for scanning cooperation with an audio channel of the record medium, said third transducer head unit having magnetic field defining means for scanning cooperation with a pair of oppositely poled, adjacent, laterally recorded tracks in said audio channel, means for successively shifting said transducer head and said third transducer head unit relative to said record medium an indexing distance, the combined width of the first channel and the audio channel, and the width of the second channel, each being substantially equal to said indexing distance, and means for coupling with said first and second and third head units for transmitting respectively relatively narrow bandwidth video signals, relatively wider bandwidth video signals and audio frequency signals.

11. A transducer system for the simultaneous recording or playback of a plurality of signals associated with the same event comprising a record medium having a plurality of sets of channels, each set consisting substantially of first, second, third, fourth and fifth channels, said second channel having a greater width than said first and third channels and being positioned intermediate said first and third channels, and said fourth and fifth channels having a lesser width than said first and third channels and being positioned immediately adjacent said first and third channels, respectively, a first transducer head having first, second and third transducer head units arranged for scanning cooperation with said first, second and third channels of each set of channels, a second transducer head having fourth and fifth transducer head units arranged for scanning cooperation with said fourth and fifth channels of each set of channels, drive means connected to said record medium for alternately changing the direction of movement of said record medium during the scanning of successive sets of channels of said record medium, first circuit means connected to said first, second and third transducer head units for supplying said transducer head units with a high frequency bias signal during recording operation, and for shifting the phase of said bias signal 180° at each reversal of the drive means, second circuit means connected to said fourth and fifth transducer head units for supplying said fourth and fifth transducer head units with a high frequency bias signal during a recording operation, and means for shifting the relation position of said first and second transducer heads with respect to said record medium a distance sufficient to cause said first, second, third, fourth and fifth transducer head units to come into scanning cooperation with respective first, second, third, fourth and fifth channels of each successive set of channels on the record medium.

12. A transducer system comprising a transducer head having first and second transducer head units spaced apart in a lateral direction for scanning cooperation with respective first and second laterally spaced channels of a record medium, said first and second head units having respective first and second scanning widths with said second scanning width being substantially greater than said first scanning width and the center to center lateral spacing between the first and second head units being at least three times said second scanning width, a further head unit for scanning cooperation with a further channel of the record medium adjacent said first channel, with the further head unit together with the first head unit defining an overall lateral scanning width corresponding to the lateral extent of the region occupied by the first and further channels together, and means for shifting said transducer head and said further head unit as a unit relative to said record medium an indexing distance at least substantially equal to the greater of said second scanning width and said overall lateral scanning width and for shifting said transducer head to at least three different positions without inversion of the record medium.

13. A transducer system comprising a transducer head having first and second laterally aligned transducer head units spaced apart in a lateral direction for scanning cooperation with respective first and second laterally spaced channels of a record medium, said first and second head units having respective first and second scanning widths with said second scanning width being substantially greater than said first scanning width and the lateral spacing between the first and second head units being at least three times said second scanning width, a further head unit for scanning cooperation with a further channel of the record medium adjacent said first channel, with the further head unit together with the first head unit defining an overall lateral scanning width corresponding to the lateral extent of the region occupied by the first and further channels together, means for shifting said transducer head and said further head unit as a unit relative to said record medium at least a channel separation distance substantially equal to the greater of said second scanning width and said overall lateral scanning width, and to at least three successive positions without inversion of the record medium, means for supplying a first video color signal to said first head unit having a relatively narrow band width and for supplying a second video color signal to said second head unit having a substantially wider band width than said first video color signal and related to the same event as said first video color signal, and means for supplying an audio signal related to the same event as said first and second video color signals to said further head unit.

14. A transducer system comprising a transducer head having first and second laterally aligned transducer head units spaced apart in a lateral direction for scanning cooperation with respective first and second laterally spaced channels of a record medium, said first and second head units having respective first and second scanning widths with said second scanning width being substantially greater than said first scanning width and the center to center lateral spacing between the first and second head units being at least three times said second scanning width, a further head unit offset laterally and longitudinally from said first transducer head unit for scanning cooperation with a further channel of the record medium directly adjacent said first channel, with the further head unit together with the first head unit defining an overall lateral scanning width corresponding to the lateral extent of the region occupied by the first and further channels together, means for shifting said transducer head and said head unit relative to said record medium at least an indexing distance substantially equal to the greater of said second scanning width and said overall lateral scanning width, and successively to at least three distinct positions without inversion of the record medium, and a record medium coupled with said first and second and said further head units and having at least three first channels and at least three further channels interlaced along a first region of the record medium for coupling with the first and further head units respectively in at least three successive indexing positions thereof as determined by said shifting means, and having a group of at least three successive second channels for coupling with said second head unit in at least three successive indexing positions of said second head unit as determined by said shifting means.

15. A playback system comprising a transducer head having first, second and third laterally aligned transducer head units spaced apart in a lateral direction for scanning cooperation with respective first, second and third laterally spaced channels of a record medium, said first, second and third head units having respective first, second and third scanning widths, the center to center lateral spacing between the first and second head units and between the second and third head units being at least three times the greatest of the scanning widths, means for successively shifting said transducer head relative to said record medium at least an indexing distance substantially equal to the greatest of said scanning widths of said head units without inversion of the record medium to place each head unit in scanning relation to successive ones of a group of at least three channels on the record medium which channels are spaced apart by said indexing distance, with the groups of at least three channels scanned by the respective head units being on separate regions of the record medium without intermixture of the channels scanned by the respective head units, and means connected to said transducer head during playback for receiving from said first head unit a video color signal having a relatively narrow band width, for receiving from said second head unit a second video color signal having a substantially wider band width than said first video color signal and related to the same event as said first video color signal, and for receiving from said third head unit a third video color signal having substantially the same band width as said first video color signal.

16. A magnetic transducer system comprising a magnetic transducer head having first, second and third magnetic transducer head units spaced apart in a lateral direction and having scanning gaps in lateral alignment for scanning cooperation with respective first, second and third laterally spaced channels of a magnetic record medium, said first and third head units having substantially the same scanning width, and said second head unit having a scanning width substantially greater than said first and third head units, the center to center lateral spacing between adjacent head units being at least three times said second scanning width, means for successively shifting said magnetic transducer head relative to said record medium at least an indexing distance substantially equal to said second scanning width to place each head unit in scanning relation to successive ones of a group of at least three channels on the magnetic record medium which channels are spaced apart by said indexing distance, with the groups of at least three channels scanned by said first, second and third head units being separate from each other, and at least one further magnetic transducer head unit having a scanning width equal to a minor fraction of the scanning width of said first and third head units and arranged for scanning cooperation with further channels of the record medium which further channels are interleaved with said first channels.

17. A magnetic playback system comprising in combination a magnetic transducer head having first, second and third laterally aligned magnetic transducer head units spaced apart in a lateral direction for scanning cooperation with respective first, second and third laterally spaced channels of a magnetic record medium, said first and third head units having substantially the same scanning widths and said second head unit having a scanning width substantially greater than said first and third head units, means for successively shifting said magnetic transducer head relative to said magnetic record medium at least an indexing distance substantially equal to the scanning width of said second head unit to place said first, second and third head units in scanning relation to successive channels of respective first, second and third groups of at least three channels on the magnetic record medium, with the groups of at least three channels scanned by said first, second and third head units being separate from each other, means coupled to said transducer head during playback for receiving information components with respect to an event from said first, second and third head units, respectively, and for combining said components to reconstruct said event.

18. A transducer system comprising a first transducer head having first, second and third transducer head units, a record medium having first, second and third video color information channels for coupling with said first, second and third transducer head units respectively and having first and second audio information channels immediately adjacent said first and third video color information channels respectively and of later extent equal to a minor fraction of the lateral extent of said first and third video color information channels, a second transducer head having fourth and fifth transducer head units for coupling with said first and second audio information channels on said record medium, and means for successively shifting said first and second transducer heads relative to said record medium at least a predetermined distance, said first, second and third transducer head units being spaced from each other center to center by at least three times said predetermined distance.

19. A magnetic playback system for reproducing video color signals and audio signals associated with the same event comprising a magnetic record medium having at least three sets of channels each set consisting substantially of first, second and third video color channels and fourth and fifth audio channels, a first transducer head having first, second and third transducer units arranged for scanning cooperation with said first, second and third video color channels respectively of each set in succession, a second transducer head having fourth and fifth transducer head units arranged for scanning cooperation with said fourth and fifth audio channels of each set in succession, circuit means for connecting a color television receiver with said first, second, third, fourth and fifth transducer head units and for visually and audibly reconstructing an event recorded on the record medium during playback, and means for successively shifting the first and second transducer heads relative to the record medium at least an indexing distance to place said first and second transducer heads in scanning relation to successive ones of at least three sets of channels on said record medium without inversion of the record medium, said first, second and third transducer head units being in transverse alignment but being spaced from each other center to center by a distance equal to at least three times said indexing distance.

20. A transducer system for the simultaneous recording of a plurality of signals associated with the same event comprising a record medium having at least three sets of channels, a transducer head having transducer head units arranged for scanning cooperation with said channels of each set of channels, drive means connected to said record medium for alternately changing the direction of movement of said record medium during the scanning of successive ones of at least three sets of channels on said record medium, circuit means connected to said transducer head units for supplying said transducer head units with a high frequency bias signal during recording operation, and for shifting the phase of said bias signal 180° at each reversal of the drive means, and means for shifting the relative position of said transducer head with respect to said record medium a distance sufficient to cause said transducer head units to come into scanning cooperation with respective channels of each successive one of at least three sets of channels on the record medium.

21. A magnetic playback system for the simultaneous reproduction of a plurality of recorded signals related to the same event comprising an elongated magnetic record medium having at least three sets of recorded channels, each set comprising a plurality of channels and having at least one channel with a predetermined maximum channel width, the recorded signals of the respective channels of each set varying along the length of the magnetic record medium in accordance with the time variation of different aspects of the same event, the channels of each set being spaced apart transversely of the record medium by a distance equal to at least three times said predetermined maximum channel width, a plurality of magnetic playback head units for scanning cooperation with the respective channels of each set in succession, said head units being in alignment in a direction at right angles to the direction of movement of the magnetic record medium and being spaced apart a distance corresponding to at least three times said maximum channel width, means for moving the magnetic record medium in the direction of its length dimension, and means for relatively shifting said playback head units at least a distance equal to said maximum channel width for placing said playback head units in scanning relation to the respective channels of the successive sets of channels in succession, said magnetic playback head units having a common keeper surface of magnetic material in sliding contact with said magnetic record medium with a pair of elongated apertures in said common keeper surface having a center to center spacing equal to at least three times the maximum channel width of the recorded channels on said elongated magnetic record medium, said playback head units extending into the respective apertures of said common keeper surface and being disposed in sliding contact with the magnetic record medium at respective recorded channels of one set.

22. The playback system of claim 21 with the transverse extent of each of said apertures being substantially equal to the maximum channel width and the keeper surface substantially completely covering and contacting the channels on each side of the channels of said one set which are in sliding contact with said magnetic playback head units.

23. A magnetic playback system for the simultaneous reproduction of a plurality of recorded signals related to the same event comprising an elongated magnetic record medium having at least three sets of recorded channels, each set comprising a plurality of channels and having at least one channel with a predetermined maximum channel width, the recorded signals of the respective channels of each set varying along the length of the magnetic record medium in accordance with the time variation of different aspects of the same event, the channels of each set being spaced apart transversely of the record medium by a distance equal to at least three times said predetermined maximum channel width, a plurality of magnetic playback head units for scanning cooperation with the respective channels of each set in succession, said head units being in alignment in a direction at right angles to the direction of movement of the magnetic record medium and being spaced apart a distance corresponding to at least three times said maximum channel width, means for moving the magnetic record medium in the direction of its length dimension, and means for relatively shifting said playback head units at least a distance equal to said maximum channel width for placing said playback head units in scanning relation to the respective channels of the successive sets of channels in succession, said playback head units being at least three in number and having a common keeper surface of magnetic material in sliding contact with the magnetic record medium, said common keeper surface having at least three transversely aligned elongated apertures therein with a center to center spacing therebetween at least three times the maximum channel width, and the transverse extent of each of the apertures being not greater than said maximum channel width.

24. A magnetic playback system for the simultaneous reproduction of a plurality of recorded signals related to the same event comprising an elongated magnetic tape record medium having a plurality of sets of recorded channels thereon, each set comprising a plurality of channels, the channels on the record medium having a center to center spacing equal to an indexing distance, and the recorded signals of the respective channels of each set varying along the length of the magnetic tape record meduim in accordance with the time variation of different aspects of the same event, the recorded signals of adjacent sets extending as a function of time in opposite directions so as to be played while the tape moves in opposite directions without inversion thereof, the channels of each set being spaced apart transversely of the record medium by a transverse distance equal to at least two times said indexing distance, a plurality of magnetic playback head units for scanning cooperation with the respective channels of each set in succession, said head units being in alignment in a direction at right angles to the direction of movement of the magnetic record medium and being spaced apart said transverse distance equal to at least two times said indexing distance, reversible tape drive means for moving the magnetic tape record medium in the direction of its length dimension and in respective opposite senses alternately, and means for relatively shifting said playback head units a distance equal to said indexing distance at each reversal of said reversible tape driving means for placing said playback head units in scanning relation to the respective channels of the respective sets of channels in succession without inversion of the record medium.

25. The playback system of claim 24 with said magnetic playback head units having a common keeper surface of magnetic material in sliding contact with said magnetic record medium with a pair of elongated apertures in said common keeper surface having a center to center spacing equal to said transverse distance, said playback head units extending into the respective apertures of said common keeper surface and being disposed in sliding contact with the magnetic tape record medium at respective recorded channels of one set.

26. The playback system of claim 25 with the transverse extent of each of said apertures being substantially equal to said indexing distance and the keeper surface substantially completely covering and contacting the channels on each side of the channels of said one set which are in sliding contact with said magnetic playback head units.

27. The playback system of claim 24 with said playback head units being at least three in number and having a common keeper surface of magnetic material in sliding contact with the magnetic record medium, said common keeper surface having at least three transversely aligned elongated apertures therein with a center to center spacing therebetween substantially equal to said transverse distance, and the transverse extent of each of the apertures being not substantially greater than said indexing distance.

28. A transducer system comprising a transducer head having first and second transducer head units spaced apart in a lateral direction for scanning cooperation with respective first and second laterally spaced channels of a record medium, the center to center lateral spacing between the first and second head units being at least three times the width of the second channel, means for successively shifting said transducer head relative to said record medium at least an indexing distance substantially equal to the width of said second channel to place each head unit in scanning relation to successive ones of a group of at least three channels on the record medium which channels have a center to center spacing equal to said indexing distance, the groups of at least three channels scanned by the first and second head units being separate from each other, and at least one further transducer head unit having a scanning width equal to a minor fraction of the width of the first channel and arranged for scanning cooperation with further channels of the record medium which further channels of the record medium are interleaved with said first channels.

29. A transducer system comprising a transducer head having first and second transducer head means spaced apart in a lateral direction for scanning cooperation with respective first and second laterally spaced channels of a record medium, the center to center lateral spacing between the first and second head means being at least three times the width of the second channel, means for successively shifting said transducer head relative to said record medium at least an indexing distance substantially equal to the width of the second channel without inversion of the record medium to place each head means in scanning relation to successive ones of a group of at least three channels on the record medium which channels have a center to center spacing equal to said indexing distance, the group of at least three first channels scanned by the first head means being on a separate region of the record medium from the group of at least three second channels scanned by the second head means without intermixture of the channels scanned by the respective head means, and means comprising said transducer head for transducing color video and audio signals with respect to a common event, said first head means being operative for the transducing of a first video color signal component having a relatively narrow bandwidth and an audio signal during scanning of the successive first channels, and said second head means being operative for the transducing of a second video color signal component having a substantially wider bandwidth than said first video color signal component during scanning of the successive second channels.

30. A transducer system comprising a transducer head for simultaneously scanning a plurality of spaced channels, said transducer head having a first head means for scanning a first composite channel to provide for transducing a color video signal component and related audio intelligence during scanning of the composite channel, and comprising a second head means for scanning a second channel to provide for transducing of a second color video signal component related to a common event with said first color video signal component, the width of the composite channel being substantially equal to the width of the second channel, and means for shifting the transducer head so as to scan successive sets of channels which channels together substantially occupy the entire width of the record medium, and the first and second head means having a center to center spacing therebetween equal to at least twice the width of the composite channel.

31. A transducer system comprising a video transducer head unit having a first scanning width for scanning cooperation with a video channel on a record medium, an audio transducer head unit having a scanning width equal to a minor fraction of the scanning width of the video transducer head unit and arranged for scanning cooperation with an audio channel on the record medium adjacent to the video channel, the audio channel and video channel together providing a composite channel with a predetermined composite channel width, and means for shifting the video and audio transducer head units jointly an indexing distance at least equal to said composite channel width to provide for the transducing of audio and video signals with respect to a plurality of composite channels on the record medium.

References Cited

UNITED STATES PATENTS

| | | | |
|---|---|---|---|
| 2,408,293 | 9/1943 | Carmel | 178—6.6 |
| 2,547,464 | 4/1951 | Hehr | 179—100.2 |
| 2,709,204 | 5/1955 | Holmes | 179—100.2 |
| 2,892,022 | 6/1959 | Houghton | 178—5.4 |
| 3,080,455 | 3/1963 | Namenyi-Katz | 179—100.2 |
| 3,271,034 | 9/1966 | Andrews | 179—100.2 |
| 3,278,694 | 10/1966 | Pastor et al. | 179—100.2 |

ROBERT L. GRIFFIN, Primary Examiner

RICHARD MURRAY, Assistant Examiner

U.S. Cl. X.R.

178—5.2, 6.6; 179—100.2